May 4, 1965 JAMES E. WEBB 3,181,821
ADMINISTRATOR OF THE NATIONAL AERONAUTICS
AND SPACE ADMINISTRATION
SPACE CRAFT SOFT LANDING SYSTEM
Filed June 4, 1964 2 Sheets-Sheet 1

INVENTOR,
TIMOTHY O. EDDINS

BY
ATTORNEYS

May 4, 1965  JAMES E. WEBB  3,181,821
ADMINISTRATOR OF THE NATIONAL AERONAUTICS
AND SPACE ADMINISTRATION
SPACE CRAFT SOFT LANDING SYSTEM

Filed June 4, 1964  2 Sheets-Sheet 2

INVENTOR.
TIMOTHY O. EDDINS

BY
ATTORNEYS

United States Patent Office 3,181,821
Patented May 4, 1965

3,181,821
SPACE CRAFT SOFT LANDING SYSTEM
James E. Webb, Administrator of the National Aeronautics and Space Administration, with respect to an invention of Timothy O. Eddins
Filed June 4, 1964, Ser. No. 372,727
13 Claims. (Cl. 244—100)

The invention described herein may be manufactured and used by or for the Government of the United States of America for governmental purposes without the payment of any royalties thereon or therefor.

This invention relates generally to energy absorbing systems for missile or spacecraft soft landings on the earth, moon or other terrestrial surfaces. More particularly, the invention relates to spacecraft energy absorbing systems of the shock impact type capable of absorbing large quantities of kinetic energy at a substantially constant rate of deceleration force applied per unit of stroke distance.

With the advent of reaction engines of greater thrust and the corresponding development of spacecraft structures and other missile systems, the possibility of effecting a landing on the moon (and other terrestrial surfaces) with a manned spacecraft capable of returning to the earth has become more realistic. There are however many problems connected with such a venture. One of these problems to which a solution had to be found was a way to deposit the spacecraft, its personnel and equipment on the lunar surface without injury to the personnel, and without excessive damage to the spacecraft and equipment needed for exploration and subsequently return to the earth. Thus, the problem of absorbing the initial landing impact shock had to be formulated, analyzed and solved. As was stated by Mr. Robert E. Lavender in a National Aeronautics and Space Adiministration publication entitled, Touchdown Dynamics Analysis of Spacecraft for Soft Lunar Landing: "It would indeed be a pity for the vehicle system to perform successfully all phases of flight to the moon only to result in a failure during the few seconds of motion remaining after initial touchdown." NASA TN D–2001, January 1964.

This specific area or problem of space flight is not to be approached as an absolute, but it is correlative with other parameters including the motion of the spacecraft from its initial position above the surface of the moon after descent from a moon orbit until the spacecraft comes to rest on the surface. Among the many parameters involved in this general problem are, for example, local "touchdown area" lunar slope, coefficient of friction, initial touchdown vertical and horizontal velocity components, vehicle weight and radius of gyration, landing gear diameter, characteristics of the impact energy absorbing devices in the landing gear, and the number of legs in the landing gear arrangement. These and other parameters are considered when the requirements of the various systems operative during this critical phase of the mission are specified. Thus, for a lunar landing, the coefficient of friction of the surface with respect to the landing gear feet, the local touchdown area slope (and degree of roughness), whether stabilization rockets will be used just before landing impact, and, of course, others are predetermined based on unmanned lunar explorations and used to calculate the design requirements of the systems to be used. For our purposes, the critical parameters in the design of an impact energy absorbing system is concerned mainly with the various force component requirements placed on the system resulting from an analysis of these other areas of investigation and the formulation of a cybernetic model of the landing problem. Therefore the present invention is directed primarily to energy absorbing devices and a spacecraft landing gear system in which they may be used.

Consistent with the other parameters involved, and based on the physical environment expected and the particular missions to be performed, various approaches to the general problem indicated above have been studied. Each of the approaches has advantages and disadvantages attendant with its implementation, and, for that reason, various combinations of approaches have been considered to offer the best solution to particular mission requirements. The following are some of the approaches which have been studied: Braking retrorockets, gas filled bags, frangible metal tubing, collapsible plastic or metal shells or cylinders, strain straps, burrowing or spike penetration, crushable materials including metal honeycomb, balsa wood or plastic foam, and structural deformation.

In addition to the above enumerated systems for braking the descent of a spacecraft, it is obvious that there are several means of effecting a recovery of a spacecraft on earth which are not available for such landings on the moon. Among these would be systems requiring a supporting atmosphere such as, for example, aerial snatch or the use of parachutes. Water landings require special environmental conditions, and skidding has been found to require a prepared landing area. However, regardless of whether the landing is to occur on a lunar or earth like surface, it is foreseeable that braking retro rockets will be used as a basic means to dissipate the kinetic energy of a spacecraft preparatory to making the soft landing with one or more other devices or methods being employed to help absorb the shock energy released on and immediately after the initial touchdown.

It is generally felt that the retro rockets would place the spacecraft approximately 15 to 60 feet above the lunar surface in a zero velocity hovering configuration. The exact altitude will depend on the results of unmanned lunar explorations indicative of the composition of the lunar surface. If there is a large quantity of loose rock and dust, as is expected, the rocket exhaust gases may make visibility difficult and may even change the local terrain features if the hovering altitude is too low. But given this hovering altitude, the spacecraft will attain a zero velocity position above the desired landing site and the rocket engines will be shut down. The spacecraft, under the influence of the local gravitational field of the moon, will accelerate toward the lunar surface and will impact with little or no attitude correction until the landing gear makes first contact with the surface. It is at this point that desirable deceleration characteristics of the landing gear configuration can mean success or failure of the mission. It is, of course, desirable that the rate of build up of the deceleration force be moderate and preferably constant until optimum deceleration force has been reached and then to remain zero (i.e. constant deceleration force) until the spacecraft has come to rest. It is necessary that there be an adequate stroke distance capacity inherent in the energy absorbing system since the longer the stroke the smaller the average deceleration forces that need be developed to absorb a given quantity of energy. The stroke must be adequate even though the exact amount of energy to be absorbed may not be precisely known in advance. The energy in this discussion has been termed kinetic energy since it can be seen that, at impact, the potential energy of the spacecraft in its zero velocity hovering position has almost all been converted to kinetic energy.

It is very desirable that the energy absorbing system exhibit to the spacecraft a constant deceleration force regardless of the total energy to be absorbed. It is also very desirable that the energy absorbing system be capable of withstanding moderate horizontal velocity components at touchdown. Among other desirable features are favorable weight and storage requirements of the system. System reliability must be high and the system must not be adversely affected by temperature extremes and variations in local atmospheric pressure. (It is anticipated that the pressure and temperature extremes to be expected on the moon are approximately zero p.s.i.a. and −250° F. to +250° F. respectively.)

The use of gas filled bags as a decelerating system has certain merit, namely they exhibit moderate rates of deceleration force build up; however, a decided disadvantage to their use is the difficulties encountered when there is a horizontal velocity component at touchdown. Rebound or bounce is another very undesirable disadvantage of these systems. Adverse temperature and pressure factors are also to be considered. Collapsible plastic or metal shells or cylinders are similar to gas filled bags but in addition, have an inherent storage problem disadvantage.

Strain straps are adaptable for use with a skidding deceleration system and therefore have requirements, including a prepared landing strip, which make its use impracticable in a lunar landing impact energy absorption system.

Burrowing or spike penetration devices exhibit high deceleration force onset-rates and have storage drawbacks as well as non-vertical velocity limitations.

With the use of crushable material systems non-vertical impact characteristics are not good, the deceleration force build-up rate is high and for a given volume of material, the stroke is limited.

The method of absorbing kinetic energy using frangible metal tubing is a system for working metal to its ultimate strength. The system installation could include a hard aluminum alloy tube attached to the spacecraft and a die attached to a landing foot. The tube, which is placed under longitudinal compression and pressed over the die, fails in circumferential tension and is split into segments. These segments are, in turn, broken into small fragments over a large percentage of the tube's length.

For structural reasons, frangible tube apparatus, as well as gas filled bags and crushable materials or structures, are short stroke devices. Therefore the force build-up must be relatively large in order to obtain the desired energy absorbing capacity. In the frangible tube method, since the tube is in longitudinal compression from the point of attachment to the spacecraft to the end of the tube in contact with the die, the length to diameter ratio of the tube must be limited to the "short column" range in order to prevent buckling. Frangible tubes have very little resistance to shear forces as they are operated on the dies, therefore, the external forces applied to the tube-die combination must act approximately parallel to the longitudinal axis of the tube. If, then, it is necessary to have an energy absorption system capable of withstanding horizontal velocity components at touchdown, there must be linkage apparatus between the spacecraft and the landing gear feet and pivoted dies so that the shear developed in the tube-die combination is eliminated. It was found in tests that though there was negligible rebound, the fragmenting process produces a fluctuating force and the additional space, weight and reliability problems associated with adapting this system to the general problem of lunar landing with a capability of withstanding moderate horizontal velocity components at touchdown make the use of the system less desirable than it appears at first glance.

Therefore, for these enumerated reasons it is quite evident that none of the devices mentioned above possess all of the desirable features required for a safe lunar landing. It may be stated that the more important disadvantages of these prior are devices are (1) inability to withstand horizontal velocity components at touchdown, (2) instability after impact (i.e. rebound and other changes in deceleration force after the optimum force has been reached), (3) excessive deceleration force build-up rate, (4) variation of deceleration force with the energy to be absorbed, and (5) weight, storage, structural strength and reliability deficiencies. These difficulties, problems and disadvantages sparked engineering effort in this area for a new concept for impact energy absorption systems for use in spacecraft designed to perform soft lunar landings.

The present invention solves the problems and disadvantages of existing energy absorbing systems proposed for use in connection with a spacecraft capable of performing soft landings on terrestrial surfaces such as the surface of the moon by providing an integral landing gear structure comprising a plurality of legs suitable for truss type construction connected to a shroud extending circumferentially around the base of the spacecraft. The legs are pivotally connected to the shroud so that during flight they are retracted and are extendable preparatory to performing a landing on the lunar surface. Preferably the landing gear will have four legs symmetrically orientated around the landing shroud. The shroud is connected to the base of the spacecraft through a plurality of novel energy absorbers adapted to absorb energy proportional to any relative movement of the spacecraft with respect to the shroud. The energy absorbers comprise a deformable metal tube pivotally connected to the spacecraft and a mandrel connected to a rod which in turn is pivotally connected to the landing shroud.

There are energy absorbers circumferentially spaced around the spacecraft and they may be orientated both horizontally and vertically or they can be so orientated to exhibit force components in both directions. Although the energy absorbers may be designed to operate in either direction, they are designed mainly so that energy is absorbed by the extrusion of the tube by the mandrel when the tube is pulled over the mandrel, thus maintaining longitudinal tension in the tube. The vertical component of force is produced when there is a relative downward motion of the spacecraft with respect to the landing shroud such as that to be expected when the landing gear legs have made initial contact with the surface upon which a soft landing is being performed. The horizontal component of force is produced by relative horizontal movement of the spacecraft with respect to the landing gear shroud. Thus the energy absorbers uniformly spaced around the base of the spacecraft and are designed to absorb energy due to relative motions of the spacecraft along and transverse to the axis of the landing shroud caused by vertical and horizontal velocity components of the spacecraft when the initial landing impact occurs. The energy absorbers restrain the motion of the spacecraft relative to the landing gear shroud and leg arrangement which will tend to come to rest on the lunar surface soon after initial impact. The energy absorbers are adapted to give predetermined constant retarding forces, and, therefore energy absorption, depending on the tube material and size. The capacity of the device depends on the length of tube used based on the desired or maximum allowable stroke. The number of energy absorbers used can be varied depending on the energy to be absorbed, the stroke desired, and the energy absoring force developed in each unit.

It is therefore an object of the present invention to provide an energy absorbing landing system for a spacecraft capable of performing soft landings on terrestrial surfaces such as that of the moon.

It is another object to provide an energy absorbing spacecraft landing system capable of absorbing impact kinetic energy uniformly with (1) a moderate deceleration force build up, and (2) predetermined constant deceleration force transmitted to the spacecraft after an optimum deceleration force is attained.

It is still another object of the present invention to provide a spacecraft landing gear energy absorption system capable of withstanding moderate horizontal velocity components on touchdown without additional structure, weight or storage requirements.

It is a further object of this invention to provide an energy absorber, simple in design, reliable in operation and not subject to extreme performance variations due to the environment in which the device must operate.

Another object of the present invention is to provide an energy absorbing device with a variable stroke which need not be precisely predetermined and which does not require modification because of variations in the anticipated stroke requirement.

Still another object is to provide a device which can absorb energy while in longitudinal tension and not subjected to buckling compressive forces.

Other and further objects and advantages of the present invention will become clear to those skilled in the art as the description thereof proceeds taken in conjunction with the drawings in which.

Figure 1:
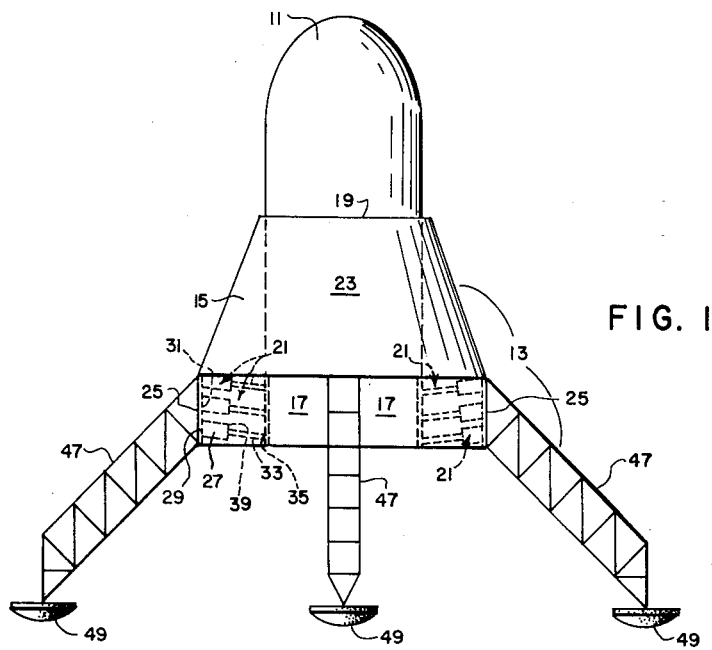
FIGURE 1 is a side elevational view of a spacecraft in a landing configuration with the energy absorption system of the present invention indicated.

Referring now to the drawings in which like reference numerals are used to indicate the same or similar parts throughout the several figures, and with initial attention directed to FIGURE 1, a spacecraft 11 is provided with a landing gear 13 comprising a landing gear shroud 15 extending circumferentially about the base 17 of the spacecraft 11. Shroud 15 is adapted to present a low friction bearing surface to the spacecraft 11 at the shroud's upper extremity 19 and is connected to the spacecraft at the base 17 thorugh a plurality of energy absorbers 21. The exterior surface of shroud 15 is shaped essentially as a frustum of a cone in its upper portion 23 and as a circular cylinder in its lower portion 25. The energy absorbers 21 comprise a tube 27, pivotally attached at one end 29 to the shroud 15 along the interior surface 31 of its lower cylindrical portion 25, and a rod 33, pivotally attached to the spacecraft base 17 at one end 35 while its free end 37 (see FIGURE 2) extends into the free end 39 of tube 27 and is securely attached to mandrel 41 with the longitudinal axes of the rod and mandrel substantially collinear.

The mandrel 41 is shaped essentially as a conical frustum with its smaller base 43 positioned toward and fixedly attached to rod 33 at its free end 37. The diameter of the mandrel smaller base 43 is slightly smaller than the diameter of the undeformed portion of tube 27 between the mandrel and the tube's free end 39 while the mandrel larger base 45 is somewhat larger than the diameter of the undeformed portion of tube 27 at the mandrel smaller base 43. The ratio of the diameter of the larger base and the diameter of the tube depends on the tube material, the anticipated stroke and the energy to be absorbed by the device per unit stroke distance. For a short distance along the tube adjacent the mandrel smaller base 43, the tube 27 may be pretapered so that the retarding force build-up, as the tube is pulled over the mandrel 41, will be moderate and constant. In fact the rate of build-up of the force needed to pull the tube over the mandrel can be predetermined and readily designed into the system.

Circumferentially spaced around the outside of the shroud lower portion 25 are four symmetrically arranged retractable landing legs 47 (see FIGURE 1) pivotally attached to the shroud. The landing legs 47 are adapted to truss construction for greater strength and reduced weight and are retractable into a stowed position (not shown) during flight prior to extension preparatory to landing. On the ends of the landing legs 47 are landing gear feet 49, the design of which will depend on the composition of the surface on which the landing is to be performed.

Figure 2:
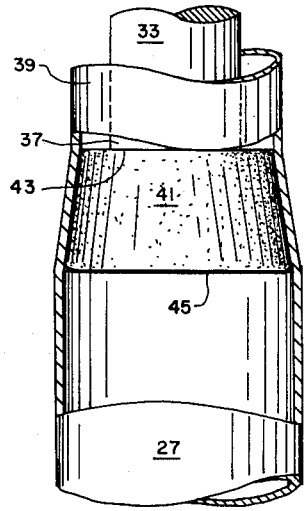
FIGURE 2 is a sectional view of one of the energy absorption units illustrated in FIGURE 1.

In operation the energy absorber illustrated in FIGURE 2 and embodied in the landing gear system of FIGURE 1 absorbs energy when there is a relative motion of the spacecraft 11 with respect to the landing gear shroud 15. Retro-thrust rocket engines (not shown) will eject the spacecraft from a lunar orbit and reduce the velocity of the vehicle relative to the lunar surface to zero at an altitude of between 15 and 60 feet (as presently envisioned). The rocket engines will be shut down and the spacecraft will accelerate toward the lunar surface under the influence of the local lunar gravity force. Small gas generator operated attitude control rockets (not shown) may be used to correct the attitude of the space craft during its descent to the lunar surface; the system, however, is designed to safely absorb the deceleration forces of landing even without this final attitude control. Presumably one of the landing gear feet 49 will come in contact with the lunar surface first and an upward force will be transmitted to the landing gear shroud at the landing gear foot making first contact with the surface. The spacecraft 11 will continue its trajectory, and, when all four feet 49 are in contact with the surface the shroud and landing leg combination will come to rest. There will then be a relative motion of the spacecraft 11 with respect to the shroud 15 which will place the energy absorbers in longitudinal tension and begin pulling the tubes 27 over the respective mandrels 41 associated therewith.

Pulling the tube over the mandrel develops in the tube both longitudinal and circumferential tensile stresses, the circumferential stresses being greater than the yield point of the material (i.e. out of the range of validity of Hook's law for the particular tube material) but only approximately 55% of the tube material's ultimate strength. Greater stresses could be used; however, the tests performed to date indicate that this stress gives the desired safety factor of reliability against tube failure in longitudinal tension in the area of the tube between the spacecraft attachment point and the mandrel. It is obvious that the tube thickness and diameter can be varied as desired according to the stroke and member of the energy absorbers used and the maximum energy to be absorbed. Each tube internal diameter or thickness can be varied in the area of the mandrel smaller base 43 to prevent large force build-up rates as mentioned above. Stroke capacity variation is attained merely by increasing or decreasing the length of the tubes.

Since the energy absorbers are pivotally attached at one end to the spacecraft and at the other to the shroud, no appreciable bending moments are placed on the energy absorbers. There is some energy absorbed in the energy absorbers by the sliding frictional heating of the mandrel and tube; however, the greater portion of the energy absorbed will result from the extrusion of the metal tube. This energy (both extrusion of the tube and frictional heating) is a linear function of the distance the tube has moved over the mandrel, and, more important, the force exhibited by the energy absorber to the spacecraft will be substantially constant and independent of the longitudinal speed of the tube relative to the mandrel. The result of the constant deceleration force is that there is no rebound and the deceleration force applied to the spacecraft by all of the energy absorbers can be determined in advance and the energy absorbers designed (as to material and size) to exhibit an optimum deceleration force and consequently a constant deceleration to the spacecraft.

Vertical velocity of the spacecraft relative to the stationary shroud will extend all of the energy absorbers approximately the same amount so that the energy absorbed by each energy absorber will be approximately the same. On the other hand, if there is a horizontal velocity component of the spacecraft after the landing shroudleg combination has come to rest, then the spacecraft will tend to translate horizontally in addition to vertically within the shroud enclosure and the energy absorbers on one side of the spacecraft will be extended further than those on the opposite side. This situation presents no problems since the total deceleration force will be constant regardless of the speed of extrusion of the tubes. As the base of the spacecraft moves to one side of the shroud, it can be seen that the horizontal force components of the energy absorbers will be different on the two sides of the spacecraft in line with the direction of the relative horizontal motion. Since the total force developed by each of the energy absorbers is approximately the same, the horizontal component of force tending to pull the base of the spacecraft against its relative horizontal motion will be larger than the horizontal component of the force tending to pull the base of the spacecraft in the direction of the spacecraft's relative motion within the landing shroud, and a fortiori, the corresponding vertical components will be different, the larger vertical component corresponding to the smaller horizontal component. Thus there is a tendency for the direction of the net total decelerating force applied to the spacecraft to shift from the vertical and align with the direction of movement of the center of mass of the spacecraft but, of course, in the opposite direction. Each of the other energy absorbers will exhibit horizontal and vertical force components proportional to their position relative to a diameter of the landing shroud normal to the spacecraft's horizontal velocity component.

The energy absorber pivotal attachments to the shroud and the spacecraft are designed to permit free pivotal motion in a vertical plane containing the two attachment points, and, in addition, allow partial movement in a plane normal to the vertical plane containing the two attachment points. Therefore the pivotal connections of the energy absorbers other than those in line with the spacecraft's horizontal velocity component are also free and not binding. It can be readily seen that the components of the decelerating force applied to the spacecraft at each of the energy absorber pivotal connection points will depend on the respective components of distance this point has moved relative to the presumed stationary landing shroud. Also, since the longitudinal stresses in the individual energy absorbers are tensile and not compressive, there is no limitation on the available stroke of the energy absorber caused by inherent characteristics of the energy absorber itself; any stroke limitation will exist solely because of other considerations such as, for example, the height of the base of the spacecraft above the landing surface when all landing feet are in contact with the surface and the landing gear shroud combination has come to rest.

Figure 3:
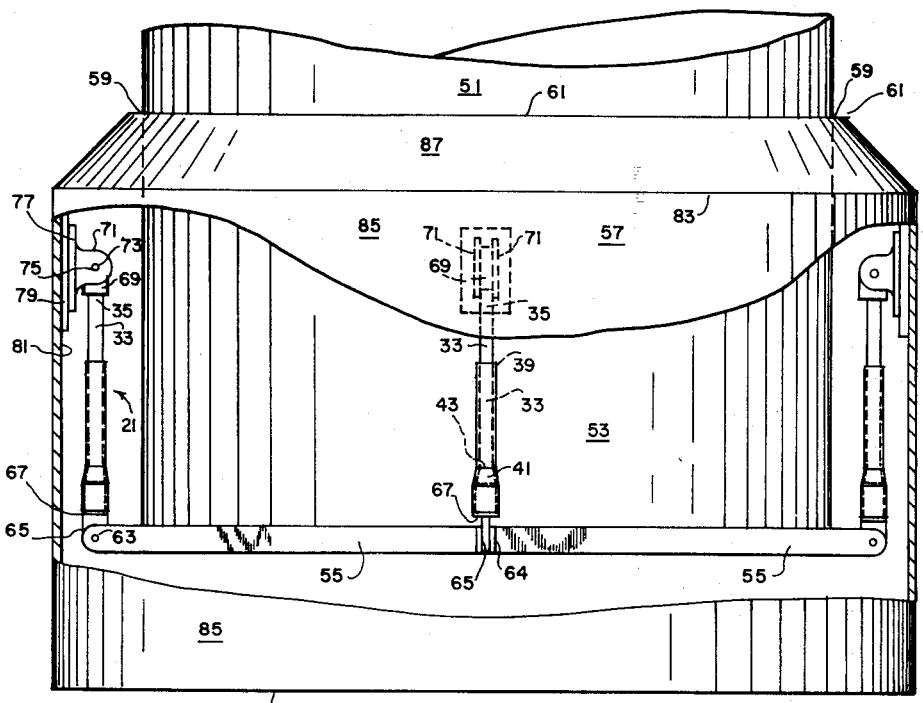
FIGURE 3 is a side elevational view partly in section illustrating the use of the present invention in a minimal horizontal velocity component landing configuration.

In FIGURE 3 there is illustrated an alternative configuration of the landing shroud for the case in which there will be a very small or no horizontal velocity of the spacecraft at touchdown. In this case, the landing gear diameter need not be as large since there will be no dynamic tumbling tendency, and in fact the landing legs have been eliminated. The spacecraft 51 has at its base 53 a flange 55 extending radially therefrom. The flange is a part of the thrust distributing structure of the spacecraft so that no additional internal structural members are required for the landing gear loads. Extending circumferentially around the base 53 is a shroud 57 of essentially cylindrical shape throughout most of its longitudinal length with a small portion thereof at the top essentially the frustum of a cone. The smaller base 59 of the conical portion is defined by a circular lip 61 which is in bearing contact with the side of the spacecraft 51. There may be provided especially designed bearing surfaces on the side of the spacecraft 51 in the vicinity of lip 61 to prevent damage to the spacecraft. The shroud 57 is attached to the base 53 of the spacecraft through energy absorbers 21.

The energy absorber tube-mandrel-rod combination is orientated the same as illustrated in FIGURE 1 with the tube portion pivotally attached to the spacecraft by pin 63 located in a recessed portion 64 of flange 55 and extending through eye 65 which is fixedly attached to tube 27 by tube end plate 67. Within the tube, mandrel 41 is orientated with its smaller base 43 rigidly attached to rod 33 which extends through the tube 27 from the mandrel out the tube free end 39. The rod has at its end 35 an eye member 69 positioned between two parallel flanges 71 with apertures 73 therein aligned with each other and with the opening in eye member 69. A pin 75 extends through the apertures 73 in flanges 71 and the opening in eye member 69 to form a pivotal attachment of rod 33 to the flanges 71 which are rigidly attached to connector base 77 which in turn is rigidly connected to shear plate 79. Shear plate 79 is a continuous annular plate rigidly attached throughout or at particular points of its length to the inner surface 81 of shroud 57 and extends to the line of juncture 83 of the shroud cylindrical portion 85 and the shroud conical portion 87. The stresses developed in energy absorber rod 33 is thus transmitted and distributed to the shroud either at specified points or continuously around the inner surface 81 of the shroud.

In operation the spacecraft and shroud will descend vertically or nearly vertically to the surface on which the landing is to be performed, shroud lunar bearing edge 89 will come in contact with the lunar surface and the shroud will come to rest while there is still a downward vertical velocity of the spacecraft. When there is relative motion of the spacecraft with respect to the shroud, the tubes will be pulled over their respective mandrels extruding the tubes and absorbing energy thereby. The deceleration force applied to the spacecraft is, as before, constant and the energy absorbed proportional to the relative distance the spacecraft has moved with respect to the shroud. The energy absorbing stroke available depends only on the length of the tubes in the energy absorbers. In this illustration four energy absorbers are shown; however, it has been demonstrated that the same energy absorption can be attained using more energy absorbers of smaller energy absorption capacity per unit of stroke distance.

Figure 4:
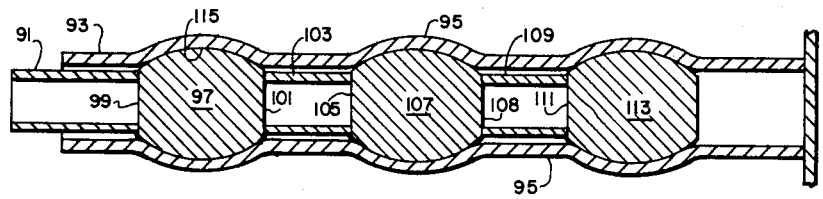
FIGURE 4 is a sectional view of a second embodiment of the energy absorption unit of the present invention.
Figure 5:
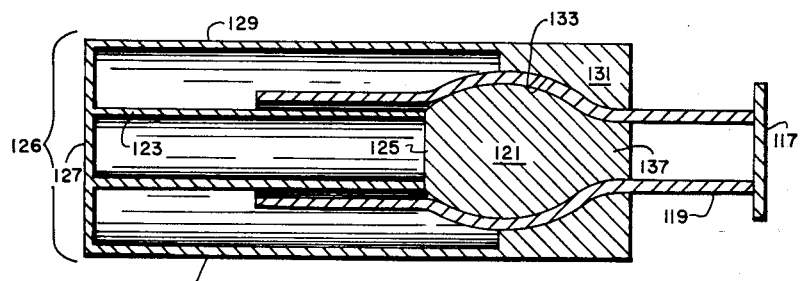
FIGURE 5 is a sectional view of a third embodiment of the energy absorption unit of the present invention.

Using the same principle of energy absorption, that is keeping the energy absorber in longitudinal tension and deforming the surface of a material substantially normal to the surface, other embodiments can be used as illustrated in FIGURES 4 and 5. A rod 91 extends in an open end 93 of a tube 95 and is rigidly attached to a mandrel 97 at its forward face 99. Mandrel 97 is shaped substantially like an ellipsoid with the ends cut by two parallel planes normal to the major axis of the ellipsoid. The mandrel 97 rearward face 101 is rigidly attached to a connecting rod 103 which in turn is rigidly attached to the forward face 105 of a second mandrel 107. Mandrel 107 is shaped similarly to mandrel 97; however, in a particular application, mandrel 107 may be slightly different in size from mandrel 97. The rearward face 108 of mandrel 107 is rigidly attached to a second connecting rod 109 which is rigidly attached to the forward face 111 of mandrel 113. Mandrel 113 is likewise shaped similarly to mandrels 97 and 107 but again may be slightly different in size than the other mandrels.

It is apparent that connective rod 109 will carry a smaller stress than connecting rod 103 and that connective rod 103 will carry a smaller stress than rod 91 due to the additional retarding forces applied by mandrels 113 and 107. The greatest transverse dimension of mandrels 97, 107 and 113 is, of course, greater than the internal diameter of the tube.

The mandrel surface 115 maximum diameter depends on the material of the tube 95 and is such that the tube is placed in circumferential tension, the stresses of which are below the yield point of the tube material (i.e. the stretching of the tube is elastic and within the range of validity of Hook's law). The size and action of mandrels 107 and 113 can be the same as that of mandrel 97 if the stretching of the tube has been elastic, and, if this is the case, the energy absorber is reusable and double acting; that is, it will absorb energy both in longitudinal tension and compression as long as the bending moments on the energy absorber will not buckle tube 95.

In the case where there is no necessity to have a reusable device or where there is not completely elastic deformation of the tube by mandrel 97, mandrels 107 and 113 will have to be of different size than mandrel 97 in order to attain optimum energy absorption from the device. Under any operable circumstances (when the ultimate strength of the tube material has not been exceeded) there will be a substantially constant retarding force developed when there is motion of the multiple mandrel rod combination relative to the tube.

FIGURE 5 is a sectional view of an energy absorber which utilized both circumferential tension and compression in the same device and, like the other devices described above, exhibits constant deceleration forces and energy absorption linearly dependent only on the stroke or relative distance the tube has moved with respect to the mandrels. There is provided tube attachment plate 117 (which is pivotally attached to the spacecraft) rigidly attached to tube 119. Positioned within tube 119 is a mandrel 121 which is rigidly attached to rod 123 at its forward face 125. Rod 123 is an integral part of a mandrel support structure 126 comprising rod end plate 127 and compressive mandrel rod 129.

It is understood that all rods mentioned and illustrated may be hollow for material and weight savings but have been termed rods because they need not be hollow and also to distinguish them readily from the tubes. Here rod 129 is, of necessity, hollow but is termed a rod in favor of consistency. Rod 129 is rigidly attached to annular compressive mandrel 131. Mandrel 131 has an interior bearing surface 133 which, though spaced apart from mandrel 121, conforms to the configuration of the exterior bearing surface 135 of mandrel 121. Tube 119 is positioned and moves within the annular space between the two mandrels.

The mandrel 121 is shaped similarly to the mandrels illustrated in FIGURE 4 except that the curvature of the mandrel bearing surface 131 is reversed near the rearward end 137 thereof and serves as a guide for the circumferential compression of the tube by mandrel 131. Thus as there is relative movement of the tube with respect to the mandrel configuration, the tube is first extruded in circumferential tension past the yield point of the tube material (i.e. where the stretching of the material is no longer within the range of validity of Hook's law) and then the action of mandrel 131 essentially draws the tube to a smaller diameter. There is energy absorbed by both the extrusion of the tube by mandrel 121 and the drawing of the tube by mandrel 131; the total force exerted is constant once there is relative movement of the tube with respect to the mandrels, and, as before, the energy absorbed is a linear function of the stroke. The energy absorbed from friction will also be essentially constant per unit stroke and the sliding frictional retarding force will be essentially constant.

There has been illustrated and described embodiments of a landing gear system and energy absorber which solve the difficulties, problems and disadvantages of prior art devices. The landing gear system can tolerate moderate horizontal velocity components when the spacecraft makes initial contact with the surface upon which a soft landing is being performed. There is no rebound, bounce or other manifestations of instability after touchdown. The rate of deceleration force buildup is controlled and constant, and once the optimum deceleration force is attained, it can be maintained until the spacecraft comes to rest. The system is adaptable to the use of truss construction of the landing gear legs with the resulting weight savings along with the overall system reliability and performance predictability.

Thus there has been described the invention in its novel aspects; however, it is to be understood that there has been shown merely embodiments of the invention and that it is not to be limited to the structure shown and described. Obviously numerous modifications and variations of the present invention within the invention's true spirit are possible in light of the above teachings. It is therefore to be understood that within the scope of the appended claims the invention may be practiced otherwise than as specifically described therein.

What is claimed is:

1. In a spacecraft having a base and adapted to perform soft landings on lunar and other terrestrial surfaces, said landings to be performed with the spacecraft in a base downward attitude, a landing gear system comprising:
    (a) a shroud extending circumferentially around but spaced apart from the spacecraft having an exterior and an interior surface;
    (b) a plurality of retractable landing legs attached at one end to and positioned around the exterior surface of the shroud and extendable to a landing configuration in preparation to landing, each of said legs having attached at the other end thereof a landing foot; and
    (c) a plurality of energy absorbers positioned in the space between the shroud and the spacecraft one end of which is attached to the spacecraft and the other to the shroud interior surface, whereby energy is absorbed by said energy absorbers when the landing feet come in contact with a lunar or other terrestrial surface upon which a soft landing is being performed causing a relative movement of the shroud with respect to the spacecraft.

2. The landing gear system of claim 1 wherein the energy absorbers include:
    (a) an energy absorbing deformable element; and
    (b) means for deforming said element when there is a relative motion of said spacecraft with respect to the shroud.

3. The combination of claim 2 wherein:
    (a) the energy absorbing deformable element has at least one surface;
    (b) the deformation of said element is substantially normal to said surface; and
    (c) the stresses produced in said element by the deformation thereof are maintained below the element's ultimate strength.

4. The landing gear system of claim 1 in which:
    (a) the attachment of the ends of the energy absorbers to the spacecraft and the shroud are pivotal; and
    (b) the energy absorbers are placed in longitudinal tension when there is a relative downward movement of the spacecraft with respect to the shroud.

5. The combination claimed in claim 1 wherein said energy absorbers absorb energy while in longitudinal tension.

6. The combination claimed in claim 2 wherein:
    (a) the energy absorbing deformable element is a substantially straight circular tube;
    (b) the means for deforming said element includes a mandrel positioned within said tube;
    (c) the deformation of said tube includes an outward radial deformation thereof which places the tube in circumferential tension in the area of the deformation; and
    (d) the stresses developed within said tube by the deformation thereof remain below the tube's ultimate strength.

7. The combination claimed in claim 2 wherein the deformation of said element produces stresses therein which remain below the elastic limit of the element.

8. The combination of claim 7 in which:
(a) the energy absorbing deformable element is a tube;
(b) the surface of the element is the interior surface of said tube; and
(c) the means for deforming said element includes a plurality of mandrels connected in tandem positioned within said tube.

9. The combination claimed in claim 3 wherein:
(a) the energy absorbing deformable element is a substantially straight circular tube having an open end;
(b) the surface is the interior surface of the tube; and
(c) the means for deforming said element includes:
(1) a conical frustum shaped mandrel positioned within said tube, said mandrel having a forward face and a rearward face, and
(2) a rod extending through said tube open end fixedly attached to said mandrel forward face and substantially colinear with the mandrel's longitudinal axis.

10. The invention claimed in claim 1 wherein said energy absorbers include:
(a) an energy absorbing deformable element having at least two substantially parallel surfaces; and
(b) means responsive to movement of said shroud with respect to said spacecraft for deforming said element substantially normal to each of said surfaces while maintaining the stresses developed in said element by the deformation thereof below the element's ultimate strength.

11. The combination of claim 10 wherein:
(a) the element is a tube;
(b) the two surfaces are the interior and exterior surfaces of said tube; and
(c) the means for deforming said element include two mandrels, an interior mandrel positioned within said tube adjacent said interior surface, and an exterior mandrel positioned without said tube adjacent said exterior surface.

12. The combination of claim 11 wherein:
(a) the tube is substantially straight and circular;
(b) the interior mandrel is substantially ellipsoidal with its maximum circumference in a plane normal to its long axis greater than the circumference of the circle formed by the intersection of a plane normal to the tube's longitudinal axis and the tube's undeformed interior surface; and
(c) the exterior mandrel is annular and has a smallest circumference adjacent said tube exterior surface smaller than the circumference of the circle formed by the intersection of a plane normal to the longitudinal axis of the tube and the tube's deformed exterior surface, whereby, when there is a movement of said tube relative to said mandrels, there is an energy absorbing deformation of said tube.

13. The combination of claim 12 wherein the interior bearing surface of said exterior annular mandrel conforms to the shape of the exterior bearing surface of said interior mandrel but is spaced apart therefrom.

References Cited by the Examiner

UNITED STATES PATENTS

| | | | |
|---|---|---|---|
| 2,391,275 | 12/45 | Shaw | 244—100 X |
| 2,578,903 | 12/51 | Smith | 188—1 |
| 3,026,972 | 3/62 | Hendry et al. | 188—1 |
| 3,059,966 | 10/62 | Spielman | 188—1 |
| 3,143,321 | 8/64 | McGehee et al. | 244—100 |
| 3,146,014 | 8/64 | Kroell | 188—1 |

FOREIGN PATENTS 412,318    4/25    Germany.

FERGUS S. MIDDLETON, *Primary Examiner.*

MILTON BUCHLER, *Examiner.*